3,091,536
PHOTOGRAPHIC FILMS COMPRISING A SYNTHETIC RESIN SUPPORT
Vincenzo Rusignuolo and Luciano Lucchetti, Terni, Italy, assignors to Montecatini Società Generale per l'Industria Mineraria e Chimica, Milan, Italy, a corporation of Italy
No Drawing. Filed Jan. 5, 1959, Ser. No. 784,869
Claims priority, application Italy Jan. 10, 1958
16 Claims. (Cl. 96—87)

This invention relates to new and novel photographic films. More particularly, the invention relates to new photographic films comprising a synthetic resin support to which the photosensitive layer is bonded by one or more intermediate adhesive layers at least one of which comprises low molecular weight atactic polypropylene.

It is known that, in the past, supports for photographic films have been made almost exclusively from cellulose derivatives. Those supports have certain important disadvantages including low resistance to water, low flexibility and low tenacity.

More recently, supports made of synthetic resins have been considered for use in photographic films. However, problems have been encountered in achieving a stable, permanent adhesion of the photographic emulsion to the resin supports.

The pending application Ser. No. 675,256, of U. Riboni, assigned to the same assignee as the present application, disclosed new photographic films in which the photosensitive layer of the film is bonded by means of adhesive, low molecular weight amorphous polypropylene, to a resin base film or support such as polyethylene, polyethylene terephthalate, polyvinyl chloride, or cellulose acetate, and preferably to a support made of polypropylene consisting prevailingly of isotactic macromolecules and which exhibits crystallinity at the X-rays.

The pending application further discloses that the binder for the photosensitive layer may consist of a mixture of the amorphous polypropylene and polyvinylpyrrolidone.

The object of the present invention is to provide photographic films in which the binder for anchoring the photosensitive layer to the support comprises the amorphous polypropylene but has improved adhesive characteristics.

This and other objects are accomplished by the present invention according to which it is found that the adhesive characteristics of amorphous polypropylene is up-graded to a remarkable extent by (a) mixing the polypropylene with certain synthetic polymers of various types, and specifically polystyrene, polyalkyleneimines, polyamides and copolymers of styrene and maleic anhydride, and/or (b) introducing reactive sulfonic or chlorosulfonic groups or chlorine directly into the amorphous polypropylene molecule.

Either procedure (a) or (b) may be adopted to increase the adhesiveness and binding power of the amorphous polypropylene, or the procedures may be used in combination. That is, the reactive groups may be introduced into the polypropylene molecule, and then the chemically modified polypropylene may be mixed with another synthetic polymer as described.

Among the polyalkyleneimines, which may be used according to the present invention, polyethyleneimine is preferred.

Practically any styrene-maleic anhydride copolymer, in a wide range of ratios of the two constituents, may be employed.

The chemical modification of the polypropylene can be carried out directly on the layer formed from the amorphous polypropylene or from a mixture thereof with another polymer having the capacity to up-grade the adhesive properties.

Also, the up-grading of the adhesive properties of the amorphous polypropylene can be accomplished by preparing a solution of the amorphous polypropylene in a suitable solvent such as chloroform, dichloro-ethane, or trichloro-ethylene, and adding the modifying polymer and/or the sulfonating or chlorosulfonating agent to the solution.

After the mixing in the solvent and/or the sulfonation reaction is completed, the support which may be and preferably is a film of crystalline polypropylene consisting prevailingly of isotactic macromolecules, is then passed through the solution at a rate regulated to insure that an adhesive layer of the desired thickness adheres to the surface thereof.

The support carrying the adhesive layer is then passed through a second bath consisting of an aqueous gelatine solution, and is finally dried.

According to another modification, the amorphous polypropylene, after mixing with a selected up-grading polymer of the group aforementioned, is subjected to sulfonation or chlorosulfonation and then deposited on the support made of the crystalline polypropylene. In still another embodiment, the mixture of the amorphous polypropylene and the up-grading polymer is deposited on the surface of the crystalline polypropylene support and the amorphous polypropylene component of the deposited layer is then sulfonated or chlorosulfonated.

The percentage of sulfur in the sulfurated or chlorosulforated amorphous polypropylene may vary between 0.5% to about 5%; while up to 10% chlorine may be introduced by chlorination or chlorosulfonation.

When the amorphous polypropylene is both chemically modified by the introduction of the reactive groups into the molecule, and mixed with the other, different up-grading polymer, the maximum adhesion of the binder layer to both the crystalline polypropylene support and the photosensitive layer is obtained.

A particularly strong adhesion is obtained when the amorphous polypropylene is both chemically modified by sulfonation or chlorosulfonation, and mixed with polystyrene.

According to a further embodiment of the invention, the amorphous polypropylene is sulfonated and then subjected to amination to effect a cross-linking of the polypropylene chains.

When the cross-linking is to be effected, an additional stage may be incorporated in the procedure for making the photographic film described hereinabove, in that the support having the layer comprising the sulfonated, chlorinated or sulfochlorinated amorphous polypropylene deposited thereon may be passed through a bath consisting of a solution of an amine or diamine in a suitable solvent such as, e.g., dioxane, before it is passed through the gelatine dispersion.

Alternatively, the sulfonated and aminated amorphous polypropylene may be prepared separately, dissolved in one of the solvents mentioned (chloroform, dichloroethane, etc.), and deposited on the crystalline polypropylene support.

If only one surface of the support is to be coated with the layer comprising the amorphous polypropylene, travel of the support through the various baths is regulated so that instead of passing through the baths the support only brushes the top of the bath so that the latter adheres to only one surface of the support. Alternatively, the solution comprising the amorphous polypropylene can be applied to one surface of the support by other methods such as spray-coating, roller-coating, brush-coating, or by depositing the adhesive material on the surface of the support in the form of thick adhesive beads dropped from a hopper provided with a scraper, etc.

The adhesive solutions used in practicing the invention contain 0.1% to 25% by weight of amorphous polypropylene. When mixtures of the amorphous polypropylene with up-grading polymers as mentioned are used, the up-grading polymer may be present in the mixture in a proportion such that the amount thereof in the final layer, after evaporation of the solvent is between 5% and 15% by weight.

As sulfonating, chlorinating, or sulfochlorinating agent may be used conc. sulfuric acid, oleum, chlorosulfonic acid, sulfuryl chloride or the like.

More than one layer of adhesive may be interposed between the support and the outer photosensitive layer. Furthermore, it is not essential for all of the adhesive layers to consist of or comprise the amorphous polypropylene. However, although the use of more than one adhesive layer is within the scope of the invention, the increased adhesiveness of the modified amorphous polypropylene renders the use of more than one adhesive layer of little value in practice.

The adhesive layer or coating may have any suitable thickness, for example in the range of 1.25 to 25 microns, preferably between 2.5 and 5.0 microns.

The photosensitive layer comprises the usual light-sensitive emulsion or dispersion such as gelatin containing silver salts. It may also contain suitable compositions for obtaining colored pictures.

The following examples are given to illustrate our new photographic film and the details of the methods used in producing it. It will be understood that these examples are not intended as limiting.

*Example 1*

10 parts by weight of amorphous polypropylene, having an intrinsic viscosity of 0.38 are dissolved in 100 parts of trichlorethylene; 2 parts of chlorosulfonic acid are added to the solution, and the mixture is heated at 50° C. for 10 minutes and is then cooled at room temperature.

An oriented and stabilized film of crystalline polypropylene consisting prevailingly of isotactic macromolecules, having a thickness of 130 microns, is passed through the solution at a rate such that it is immersed in the solution for 0.5 second. The film is then kept at 25° C. for 20 seconds and dried in a stream of hot air. It is then passed through a bath consisting of a solution of 5 parts of photographic gelatine in 95 parts of water, at a temperature of 40° C., again at a rate such that it is immersed in the solution for 0.5 second, and is then dried.

Abrasion tests carried out on the film prepared as described have demonstrated that the gelatine layer is fixed stably to the crystalline polypropylene film.

*Example 2*

An oriented film of crystalline polypropylene having a thickness of 130 microns is passed through a bath consisting of a solution of chlorosulfonated amorphous polypropylene as in Example 1, and at a rate such that it is immersed in the solution for 0.5 second. Without intermediate drying, the film is then passed through a bath consisting of a solution of 2 parts isobutylamine in 98 parts dioxane, the immersion time in the second bath being also 0.5 second, during which the amination of the chloro-sulfonated polypropylene is initiated and completed.

The film is dried rapidly in a stream of hot air, immersed in the 3% gelatine dispersion at 40° C., and then dried. The adhesion of the photosensitive layer to the crystalline polypropylene film is very good.

*Example 3*

A supporting film of the crystalline polypropylene is passed successively through four baths, with an immersion time of 0.5 second in each bath. The successive baths have the following compositions:

(a) A solution of 5 parts amorphous polypropylene in 95 parts trichlorethylene;
(b) A solution of 2 parts chlorosulfonic acid in 95 parts trichlorethylene;
(c) A solution of 2 parts isobutylamine in 98 parts dioxane; and
(d) A solution of 5 parts gelatine in 95 parts water.

The film is dried in a stream of hot air between baths (c) and (d). After final drying, the film has characteristics identical with those of the film of Example 1.

*Example 4*

10 parts of amorphous polypropylene as in Example 1 are dispersed, at 50° C. and with moderate agitation, in 100 parts phosphosulfonic acid. After 10 minutes, the polypropylene is separated by filtration, washed with nitromethane and dispersed in 100 parts of diethanolamine for 10 minutes at 50° C.

After separation, the amorphous polypropylene is dissolved in 200 parts chloroform, and the chloroform solution is used for anchoring a photosensitive layer to a crystalline polypropylene base.

*Example 5*

A solution of 5.0 parts by weight of amorphous polypropylene, 1.0 part polyethyleneimine, 100 parts chloroform and 20 parts ethanol is spread on an oriented film of crystalline polypropylene having a thickness of 130 to 140 microns.

After the coating is dried, a solution of 5.0 parts gelatine in 100 parts of water is spread directly on the coating, and thereafter an aqueous emulsion of a silver halide and gelatine is deposited thereon.

Even after the film thus prepared is subjected to development and fixing, the adhesion of the photosensitive layer to the support remains unaltered.

*Example 6*

A solution of 8 parts (by weight) of amorphous polypropylene, 0.4 part styrene-maleic anhydride copolymer, and 100 parts chloroform is spread on a film of crystalline polypropylene. The photographic gelatin adheres tenaciously to the treated film and cannot be separated from it by abrasion, cutting or breaking.

*Example 7*

A film of crystalline polypropylene is passed through a bath consisting of 8 parts amorphous polypropylene, 0.4 part polystyrene and 100 parts chloroform.

The film is then passed successively through baths having, respectively, the following compositions:

(a) A solution of 2.0 parts chlorosulfonic acid in 98 parts trichlorethylene;
(b) A solution of 2.0 parts isobutylamine in 98 parts dioxane.

The film is immersed in each of the baths for 0.5 second.

After removal from bath (b), the film is dried, and then immersed in a solution of 5 parts gelatine in 95 parts water. After drying, the resulting photographic film does not undergo separation or alteration of the various adhered layers when it is subjected to abrasion, cutting or jerking.

*Example 8*

An oriented film of crystalline polypropylene having a thickness of 130 microns is treated as described in Example 7.

The second bath consists of pure phosphosulfonic acid, and the third of pure monoethanolamine. After final drying, the photographic film shows the same adhesion of the photosensitive layer to the crystalline polypropylene support as the photographic film of Example 7.

The amorphous polypropylenes used in practicing the invention are the propylene polymers which consist prevailingly of linear, regular head-to-tail atactic macromolecules recently disclosed by G. Natta et al. and which may be produced directly, as the crude polymerizate, by polymerizing propylene with a catalyst prepared from a halide of a transition metal of groups IV to VI inclusive of the Mendeleeff Periodic Table in which the metal has a valency higher than 3, such as $TiCl_4$, and an organometallic compound of an element of groups II to III of said table. Preferably, the low molecular weight amorphous polypropylene has an intrinsic viscosity of from about 0.2 to about 0.4, measured in tetralin at 135° C.

The crystalline polypropylenes used for making the support for the film are the propylene polymers disclosed by Natta et al. which consist prevailingly of macromolecules having the stereoregular structure which Natta has termed the "isotactic" structure, and which is characterized in that, at least for very long sections of the main chain, or of substantially the main chain, the tertiary asymmetric carbon atoms of the successive monomeric units have the same steric configuration.

The crystalline polymers may be obtained directly, as the crude polymerizate, by polymerizing propylene with solid, high crystalline catalysts prepared from halides of the transition metals, supra, in which the metal has a valency not higher than 3, and an organometallic compound as defined, and such as triethyl aluminum.

The molecular weight of the polymers which can be mixed, according to the present invention, to the atactic polypropylene, is not critical.

It has been shown that the direct bonding of the photosensitive gelatin layer to the crystalline polypropylene support can be facilitated by chemically modifying the crystalline polypropylene by introducing reactive sulfonic, chlorosulfonic groups or chlorine into the polymer molecule. However, the chemical modification had to be carried out superficially on the support formed of the crystalline polypropylene and had to be effected very carefully since immersion of the support in the sulfonating solution for a time sufficient for the modification to take place throughout the whole thickness of the film results in a marked down-grading of the normally excellent mechanical properties of isotactic polypropylene and of the support made therefrom.

The present invention represents a marked improvement over the photographic films in which the photosensitive layer is deposited on a support of crystalline polypropylene superficially modified by the introduction of the reactive groups, since the reactive groups can occur at all portions of the intermediate adhesive layer comprising amorphous polypropylene and the excellent mechanical properties of the crystalline polypropylene support, such as high mechanical strength, flexibility, etc. are retained substantially unaltered.

The foregoing examples clearly demonstrate the upgrading effect of the chemical modification of the amorphous polypropylene and/or the combination thereof with the other polymers disclosed, in increasing the adhesive capacity of the polypropylene. Various changes in the details given may be made in practicing the invention without departing from the spirit thereof, and we intend to include in the scope of the appended claims all such modifications and variations as may be apparent to those skilled in the art from the description and examples given herein.

What is claimed is:

1. A method of making photographic films which comprises providing at least one surface of a synthetic resin support with at least one adhesive layer at least one of which has a composition selected from the group consisting of (a) mixtures of low molecular weight amorphous polypropylene containing substituents selected from the group consisting of sulfonic, chloro, and chlorosulfonic groups in a proportion such that the total sulfur combined in the polypropylene is between 0.5% and about 5% and the total chlorine combined therein is not higher than 10%, with a polymer selected from the group consisting of polystyrene, polyalkyleneimines, polyamides and copolymers of styrene and maleic anhydride; and (b) the low molecular weight chemically modified amorphous polypropylenes containing the substituent groups as recited under (a); then depositing an aqueous gelatin dispersion of a silver halide on the intermediate adhesive layer, and finally drying the support.

2. A method for making photographic films which comprises providing at least one surface of a synthetic resin support with at least one adhesive layer at least one of which comprises a mixture of a low molecular weight amorphous polypropylene containing, in the polymer molecule, substituent groups selected from the group consisting of sulfonic, chloro, and chlorosulfonic groups in a proportion such that the total combined sulfur is between 0.5% and about 5% and the total combined chlorine is not higher than 10%, with a polymer selected from the group consisting of polystyrene, polyalkyleneimines, polyamides and copolymers of styrene and maleic anhydride, then depositing an aqueous gelatin dispersion of a silver halide on the intermediate adhesive layer, and finally drying the support.

3. A method of making photographic films which comprises providing at least one surface of a synthetic resin support with at least one adhesive layer at least one of which comprises a low molecular weight amorphous polypropylene containing, in the polymer molecule, substituent groups selected from the group consisting of sulfonic, chloro and chlorosulfonic groups in a proportion such that the total combined sulfur is between 0.5% and about 5% and the total combined chlorine is not higher than 10%, then depositing an aqueous gelatin dispersion of a silver halide on the intermediate adhesive layer, and finally drying the support.

4. A method for making photographic films which comprises contacting a support made of crystalline polypropylene consisting prevailingly of isotactic macromolecules with an adhesive solution of from 0.1% to 25% by weight of a low molecular weight amorphous polypropylene containing substituent groups selected from the group consisting of sulfonic, chloro and chlorosulfonic groups in a proportion such that the total combined sulfur is between 0.5% and about 5% and the total combined chlorine is not higher than 10%, to deposit a layer of said adhesive solution on at least one surface of the support, then applying an aqueous gelatin dispersion of a silver halide to the surface of the support carrying the adhesive layer, and finally drying the support.

5. A method for making photographic films which comprises applying to a support made of crystalline polypropylene consisting prevailingly of isotactic macromolecules an adhesive solution containing from 0.1% to 25% by weight of a low molecular weight amorphous polypropylene containing substituent groups selected from the group consisting of sulfonic, chloro, and chlorosulfonic groups in a proportion such that the total combined sulfur in the polypropylene is from 0.5% to about 5% and the total combined chlorine therein is not higher than 10%, to deposit a layer of said adhesive solution on at least one surface of the support, treating the surface of the support carrying the adhesive layer with a solution of an aminating agent, then applying an aqueous gelatin dispersion of a silver halide to said surface, and finally drying the support.

6. A method for making photographic films which comprises passing a support made of crystalline polypropylene consisting prevailingly of isotactic macromolecules successively through the following baths: first a bath consisting of an adhesive solution of from 0.1% to 25% by weight of a low molecular weight amorphous polypropylene containing substituent groups selected from the group consisting of sulfonic, chloro and chlorosulfonic groups in a proportion such that the total combined sulfur in the polypropylene is from 0.5% to about 5% by weight and the total combined chlorine is not higher than 10% by weight to deposit a layer of said adhesive solution on both surfaces of the support; and second, a bath consisting of an aqueous gelatin dispersion of a silver halide; and finally drying the support.

7. A method for making photographic films which comprises applying to at least one surface of a support made of crystalline polypropylene consisting prevailingly of isotactic macromolecules an adhesive solution of a mixture of from 5 to 15% by weight of polystyrene and from 0.1% to 25% by weight a low molecular weight amorphous polypropylene containing substituent groups selected from the group consisting of sulfonic, chloro and chlorosulfonic groups in a proportion such that the total combined sulfur in the polypropylene is from 0.5% to about 5% by weight and the total combined chlorine in the polypropylene is not higher than 10% by weight, applying to the adhesive layer a gelatin dispersion of a silver halide, and finally drying the coated support.

8. A method for making photographic films which comprises applying to at least one surface of a support made of crystalline polypropylene consisting prevailingly of isotactic macromolecules an adhesive solution of a mixture of from 5% to 15% by weight of a polyalkyleneimine and from 0.1% to 25% of a low molecular weight amorphous polypropylene containing substituent groups selected from the group consisting of sulfonic, chloro and chlorosulfonic groups in a proportion such that the total combined sulfur in the polypropylene is from 0.5% to about 5% by weight and the total combined chlorine is not higher than 10% by weight, applying to the adhesive layer a gelatin dispersion of a silver halide, and finally drying the coated support.

9. A method for making photographic films which comprises applying to at least one surface of a support made of crystalline polypropylene consisting prevailingly of isotactic macromolecules an adhesive solution of a mixture of from 5% to 15% by weight of a polyamide and from 0.1% to 25% by weight of a low molecular weight amorphous polypropylene containing substituent groups selected from the group consisting of sulfonic, chloro and chlorosulfonic groups in a proportion such that the total combined sulfur in the polypropylene is from 0.5% to about 5% by weight and the total combined chlorine is not higher than 10%, applying to the adhesive layer an aqueous gelatin dispersion of a silver halide, and finally drying the coated support.

10. A method for making photographic films which comprises applying to at least one surface of a support made of crystalline polypropylene consisting prevailingly of isotactic macromolecules an adhesive solution of a mixture of from 5% to 15% by weight of a copolymer of styrene and maleic anhydride and from 0.1% to 25% by weight of a low molecular weight amorphous polypropylene containing substituent groups selected from the group consisting of sulfonic, chloro and chlorosulfonic groups in a proportion such that the total combined sulfur in the polypropylene is from 0.5% to about 5% by weight and the total combined chlorine is not higher than 10%, applying to the adhesive layer an aqueous gelatin dispersion of a silver halide, and finally drying the coated support.

11. As a new article of manufacture, a photographic film comprising a support formed of crystalline polypropylene consisting prevailingly of isotactic macromolecules, an outer layer of gelatin containing a silver halide and, disposed between the outer layer and support, and anchoring the two together, at least one intermediate layer at least one of which consists essentially of a strongly adhesive binder having a composition selected from the following (a) a mixture of a low molecular weight polypropylene consisting prevailingly of atactic polypropylene containing substituent group selected from the group consisting of sulfonic, chloro, and chlorosulfonic groups in a proportion such that the total combined sulfur in the polypropylene is from 0.5% to about 5% by weight and the total combined chlorine is not higher than 10%, with a polymer selected from the group consisting of polystyrene, polyalkyleneimines, polyamides and copolymers of styrene and maleic anhydride; and (b) the low molecular weight polypropylene containing the substituent groups as recited under (a).

12. As a new article of manufacture, a photographic film comprising a support formed of crystalline polypropylene consisting prevailingly of isotactic macromolecules, an outer layer of gelatin containing a silver halide and, disposed between the outer layer and support, and anchoring the two together, at least one intermediate layer at least one of which is a strongly adhesive layer which consists essentially of a mixture of a low molecular weight polypropylene consisting prevailingly of atactic macromolecules and containing, in the polymer molecule, substituent groups selected from the group consisting of sulfonic, chloro and chlorosulfonic groups in a proportion such that the total combined sulfur is between 0.5% and about 5% by weight and the total combined chlorine is not higher than 10% by weight, with polystyrene.

13. As a new article of manufacture, a photographic film comprising a support formed of crystalline polypropylene consisting prevailingly of isotactic macromolecules, an outer layer of gelatin containing a silver halide and, disposed between the outer layer and support, and anchoring the two together, at least one intermediate layer at least one of which is a strongly adhesive layer which consists essentially of a mixture of a low molecular weight polypropylene consisting prevailingly of atactic macromolecules and containing, in the polymer molecule, substituent groups selected from the group consisting of sulfonic, chloro and chlorosulfonic groups in a proportion such that the total combined sulfur is between 0.5% and about 5% by weight and the total combined chlorine is not higher than 10% by weight, with a polyalkyleneimine.

14. As a new article of manufacture, a photographic film comprising a support formed of crystalline polypropylene consisting prevailingly of isotactic macromolecules, an outer layer of gelatin containing a silver halide and, disposed between the outer layer and support, and anchoring the two together, at least one intermediate layer at least one of which is a strongly adhesive layer which consists essentially of a mixture of a low molecular weight polypropylene consisting prevailingly of atactic macromolecules and containing, in the polymer molecule, substituent groups selected from the group consisting of sulfonic, chloro and chlorosulfonic groups in a proportion such that the total combined sulfur is between 0.5% and about 5% by weight and the total combined chlorine is not higher than 10% by weight, with a polyamide.

15. As a new article of manufacture, a photographic film comprising a support formed of crystalline polypropylene consisting prevailingly of isotactic macromolecules, an outer layer of gelatin containing a silver halide and, disposed between the outer layer and support, and anchoring the two together, at least one intermediate layer at least one of which is a strongly adhesive layer which consists essentially of a mixture of a low molecular weight polypropylene consisting prevailingly of atactic macromolecules and containing, in the polymer molecule, substituent groups selected from the group consisting of sulfonic, chloro and chlorosulfonic groups in a proportion such that the total combined sulfur is between 0.5% and about 5% by weight and the total combined chlorine is not higher than 10% by weight, with a copolymer of styrene and maleic anhydride.

16. As a new article of manufacture, a photographic film comprising a support formed of crystalline polypropylene consisting prevailingly of isotactic macromolecules, an outer layer of gelatin containing a silver halide and, disposed between the outer layer and the support, and anchoring the two together, at least one intermediate layer at least one of which is strongly adhesive and consists essentially of a low molecular weight polypropylene consisting prevailingly of atactic macromolecules and containing, in the polymer molecule, substituent groups selected from the group consisting of sulfonic, chloro and chlorosulfonic groups in a proportion such that the total combined sulfur is between 0.5% and about 5% by weight and the total combined chlorine is not higher than 10% by weight.

References Cited in the file of this patent

UNITED STATES PATENTS

| | | |
|---|---|---|
| Re. 24,062 | Horton | Sept. 20, 1955 |
| 2,773,769 | Goldschein | Dec. 11, 1956 |
| 2,786,783 | Hahn et al. | Mar. 26, 1957 |
| 2,805,173 | Ambler | Sept. 3, 1957 |
| 2,927,047 | Schulde et al. | Mar. 1, 1960 |